Patented Apr. 29, 1952

2,595,176

UNITED STATES PATENT OFFICE 2,595,176

PRODUCTION OF WATER-SOLUBLE LITHIUM SALTS FROM LITHIUM ALKALI PHOSPHATES

Jerome W. Sprauer, Niagara Falls, N. Y., assignor to The Pennsylvania Salt Manufacturing Company, Philadelphia, Pa., a corporation of Pennsylvania No Drawing. Application February 4, 1949, Serial No. 74,705

3 Claims. (Cl. 23—87)

This invention relates to a process by which the commercially available water-insoluble lithium phosphates may be effectively and economically converted into more soluble and more useful lithium compounds.

One of the forms in which lithium is commercially available is in the form of lithium alkali metal phosphates. For example, a product of the approximate formula $Li_2NaPO_4$ is commercially available, its source being a by-product of the recovery of salts from Searles Lake, California, alkali deposits. (See the description of this source by W. A. Gale, Chem. Ind., 57, 442-6 (1945).)

In the form of a phosphate as above described, the lithium is not readily available for the production of desired lithium compounds. For example, in order to make lithium hypochlorite compositions in accordance with the process of Patent No. 2,356,820 of August 29, 1944, it is necessary that the lithium be available either as lithium hydroxide, lithium chloride, or other lithium salt of high water-solubility.

I have now found that lithium as above described may be placed in a very desirable water-soluble form by the simple procedure of (a) treating the lithium phosphate, in suspension in an aqueous medium, with a strong acid, for example hydrochloric acid, (b) adding to this mixture a water-soluble calcium salt, preferably as an aqueous solution containing from about three-quarters to about one and one-half mols calcium ion for each mol of phosphate in the lithium phosphate, and (c) separating liquid phase from solid phase in the resulting mixture. The liquid phase thus obtained may contain up to 90% or more of the original lithium.

If further purification of this lithium-containing liquid is desired to remove small proportions of calcium, soda ash may be added in amounts sufficient to precipitate the calcium as carbonate. The result is an aqueous solution in which the solute, when recovered as solid, consists almost entirely of lithium chloride; a very small proportion of sodium chloride may also be present. If desired this solution may be evaporated to obtain the soluble lithium compound solute in solid form. Either the solution or the solid thus obtained may be used to produce other desired lithium compounds by methods known in the art. For example, a solution of this material may be electrolyzed to produce lithium hydroxide.

The process of the invention is applicable for solubilization generally of water-insoluble lithium alkali metal phosphates; i. e., insoluble lithium sodium phosphates, insoluble lithium potassium phosphates, or other insoluble lithium alkali phosphates, containing various ratios of lithium atom to the other alkali atoms. The important commercial source of lithium at present in this class is the lithium sodium phosphate of approximate formula $Li_2NaPO_4$, but products that may approximate $LiNa_2PO_4$, $LiK_2PO_4$, $Li_2KPO_4$, $LiNaKPO_4$, and other combinations of Li, Na, K and other alkalis with phosphate, in various ratios, when substantially water-insoluble, are suitable for treatment by the process of my invention.

In step (a), and strong acid may be used whose calcium salt is more soluble than any calcium salt of phosphoric acid. Examples include hydrochloric acid, nitric acid, sulfuric acid, various sulfonic acids, and the like. The amount of acid employed may be varied from a small mol fraction of the phosphate treated to many times the molar quantity of phosphate. Amounts ranging from one-quarter an equivalent weight of acid per mol phosphate to ten or twenty times this amount are suggested. It is an interesting feature of my invention that the amount of acid employed may be substantially less than the stoichiometric equivalent of the cationic portion of the lithium phosphate (which would be three equivalent weights acid per mol phosphate); for example, from one-quarter to two mols HCl per mol phosphate is quite suitable.

In step (b), any calcium salt of at least moderate solubility may be used. Examples include calcium chloride, calcium nitrate, the calcium sulfonates, and even calcium sulfate. Moreover, similar barium or strontium salts could be substituted for the calcium salt, though this would usually be economically unsuitable.

The following example is illustrative of the process of my invention.

Example 20 parts of the Searles Lake by-product lithium phosphate of the approximate formula $Li_2NaPO_4$ were mixed with 80 parts of water. Concentrated hydrochloric acid was added with stirring approximately in the proportion of about one HCl for each mol of phosphate. The resulting mixture is in the form of a slurry. A solution of calcium chloride was then added to this slurry with stirring in the proportion of about one $CaCl_2$ for each HCl added in the preceding step. The whole was then filtered, yielding a solution of lithium and sodium chlorides containing 90% of the original lithium and containing minor proportions of calcium and phosphate. Soda ash was added to this solution in amount sufficient to precipitate the calcium and the suspension was evaporated and filtered to yield a solution containing 29.4% LiCl and 0.8% NaCl.

The solubilization procedure of the above example would also be applicable to other substantially water-insoluble lithium alkali phosphates, as above described, to produce a lithium chloride solution.

Similarly, a procedure as in the above example employing sulfuric acid and a calcium sulfate solution or slurry would yield a solution containing lithium sulfate as the end product. Upon employing nitric acid and a calcium nitrate solution, the end product would be a solution containing lithium nitrate. The procedure in each case would be essentially as above described. Moreover, a soluble calcium salt having an anion different than the acid anion could also be employed and in that case the end product lithium solution may be a mixed salt.

Since many modifications are possible in the process of my invention as above described without departing from the scope of the invention, it is intended that the above description of my invention should be interpreted as illustrative, and the invention is not to be limited thereby.

I claim:

1. The process for production of a water-soluble lithium salt from a water-insoluble lithium alkali phosphate that involves treating the phosphate with an aqueous solution of a strong acid in amount less than the stoichiometric equivalent of the cationic portion of the lithium phosphate, adding to the resulting slurry from about three-quarters to about one and one-half mols of a soluble calcium salt for each mol of $PO_4$ present, and separating liquid phase from solid phase in the resulting mixture.

2. The process for production of a water-soluble lithium salt from $Li_2NaPO_4$ that involves treating the phosphate with aqueous hydrochloric acid solution in the amount of not more than 2 mols HCl per mol phosphate, adding to the resulting slurry from about three-quarters to about one and one-half mols $CaCl_2$ for each mol phosphate present, separating liquid phase from solid phase in the resulting mixture, and adding sufficient soda ash to the resulting solution to precipitate substantially all calcium contained therein.

3. The process for production of a water-soluble lithium salt from a water-insoluble lithium alkali phosphate that involves treating the phosphate, in an aqueous meduim, with a strong acid in amount less than the stoichiometric equivalent of the cationic portion of the lithium phosphate, adding to the resulting slurry a soluble alkaline earth metal salt in sufficient amount to insolubilize the phosphate radical, and separating liquid phase from solid phase in the resulting mixture.

JEROME W. SPRAUER.

REFERENCES CITED

The following references are of record in the file of this patent:

UNITED STATES PATENTS

| Number | Name | Date |
|---|---|---|
| 140,559 | Tanner | July 1, 1873 |
| 2,059,750 | Roder et al. | Nov. 3, 1936 |